Oct. 6, 1942.  F. S. DENNEEN ET AL  2,297,878

METHOD OF MAKING HARDENED COMPOSITE ARTICLES

Filed May 1, 1940

INVENTORS.
FRANCIS S. DENNEEN
WILLIAM C. DUNN
BY
ATTORNEYS.

Patented Oct. 6, 1942

2,297,878

UNITED STATES PATENT OFFICE 2,297,878

METHOD OF MAKING HARDENED COMPOSITE ARTICLES

Francis S. Denneen, Cleveland, and William C. Dunn, Shaker Heights, Ohio, assignors to Ohio Crankshaft Company, Cleveland, Ohio, a corporation of Ohio Application May 1, 1940, Serial No. 332,714

1 Claim. (Cl. 148—4)

This invention relates to a method of manufacturing a composite article formed by bonding or fusing the parts together and provided in its finished form with a hardened wear-receiving face adapted for use as a bearing surface in conjunction with the remainder of the article. This application is a continuation-in-part of our application Serial No. 747,347, filed October 8, 1934.

The manufacture of articles by fusing or bonding two parts thereof together is well established and generally consists in the application of one part to another followed by heating the opposed surfaces to the fusing temperature. The manufacture of such articles has been open to some difficulty in uniformly and properly heating materials adjacent the bonding zone in order to insure a rugged and permanent bond.

The general object of our invention has been to provide a method of making such composite articles, usually formed of two metallic parts such that the desired uniformity in heating is rapidly and efficiently obtained to insure a permanent bond. A further object of the invention has been to provide a method by which a wear-receiving face of the article may be hardened, by the same heating member which raises the parts to fusion temperature, to the end that a hardened bonded article may be made in what may be considered one operation.

To the accomplishment of the foregoing and related ends, said invention, then, consists of the means hereinafter described and particularly pointed out in the claim; the annexed drawing and the following description setting forth in detail certain means and one mode, constituting, however, but one of various applications of the principle of our invention.

Figure 1:
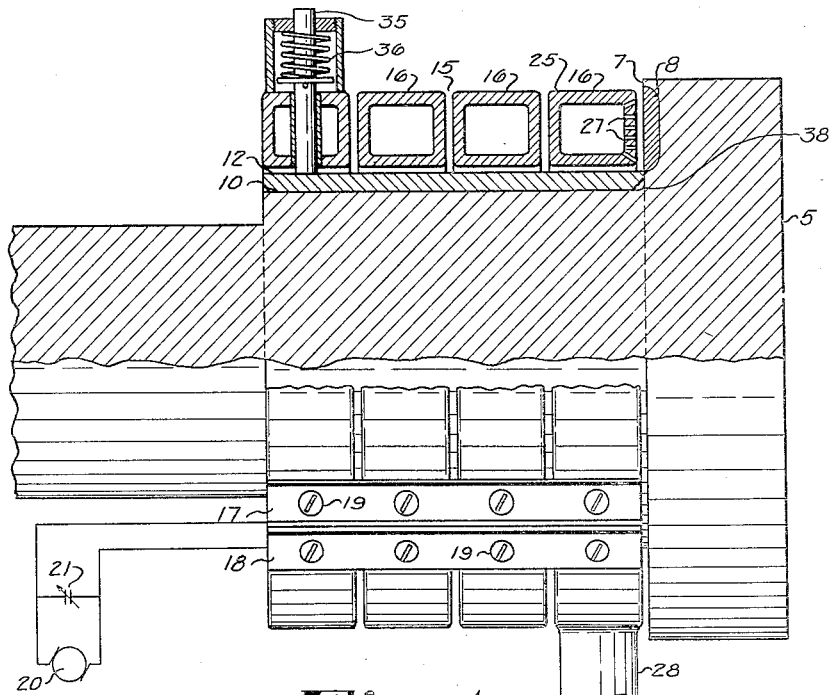
Figure 2:
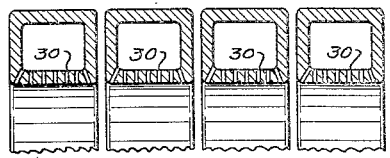

In said annexed drawing:

Fig. 1 is a composite view, the upper half in section, the lower half in elevation, of an article undergoing manufacture under the present invention; and Fig. 2 is a fragmentary section showing a modified form of inductor used with the above method.

While the following description relates to the manufacture of a particular shape and kind of article it will be at once understood that the invention is not limited solely to such shape and that wide variations in the type of article made are possible with the present invention and come within its scope and terms.

Referring to Fig. 1, we have shown an article consisting of a shaft end which is made of hardenable material, as steel, and indicated at 5, and is provided with a radial thrust face 7 which is to be hardened, as indicated at 8. A cylindrical bearing surface of the article, indicated at 10 is to be provided with a bushing or sleeve 12 bonded thereto along the cylindrical surface of the article.

The sleeve 12 may be formed of one of several materials, depending on the use to which it is to be put. If it is intended as a race for roller or ball bearings it will be made of steel and hardened, as will also be the case with certain types of sliding bearings. Under some conditions the sleeve may be made of brass or other soft metal to provide a softer surface for bearing wear in connection with a cooperating housing. The hardened zone 8 is not provided in every article made under the present invention, but is of advantage in all cases where a hardened thrust face is required on the shaft.

While the drawing shows a shell provided for bearing use it will be apparent that the invention is applicable wherever two or more parts are bonded together under the present method.

To effect the bonding and hardening above referred to, an inductor 15 formed of a plurality of closely spaced hollow copper rings 16 is provided. The rings do not form complete circles, but are split as indicated and connected in parallel at their ends by two copper bars 17 and 18 respectively, bolted as at 19 to each of the rings. The result is to form a multipart inductor which, considered electrically, consists of one turn and which is connected to a suitable source of periodically varying current, well known in the art, and indicated as a motor generator 20 with a variable tuning condenser 21 across the leads leading to opposite sides of the inductor.

A jig or fixture, not shown but of simple construction, supports the article and the inductor in closely spaced relation with each other such that no electrical contact exists therebetween.

When the parts are assembled in the position of Fig. 1, the inductor is energized to establish a flux field threading the sleeve 12 and the adjacent shaft part and including the bonding region and the region 8 to be hardened. As a result of this action the cooperating faces of the sleeve and the shaft become heated to a bonding temperature and are bonded together.

In certain types of bonding a coating or joining metal such for instance as copper, brazing spelter or other suitable material is employed to facilitate the bond formation and to fill any interstices existing between the sleeve and the shaft.

Simultaneously with the heating to attain a bonding temperature the region 8 adjacent the inductor ring 25 will be heated to an elevated temperature and be hardenable by quenching.

To quench the thrust bearing portion and obtain a hardened structure the adjacent ring 25 is provided with a series of holes 27 adapted to discharge quench from the interior of the ring against the surface 7 to rapidly cool the same after the desired temperature has been reached. Coolant is admitted at the end of the heating cycle to the ring 25 by a coolant supply pipe 28, the effect being not only to quench the surface but to cool the inductor. In heating for prolonged periods the other inductor rings should likewise be cooled and as there are no quench passages therein a cooling medium may be constantly circulated through them. It will be apparent that the quenching fluid does not come in contact with the bonding zone because of the sealing effect of the sleeve and particularly the end 24 thereof bearing against the radial face 7.

The sleeve exterior, if of hardenable formation, may be hardened at the same time it is bonded to the shaft. This is accomplished by bringing the exterior portion to hardening temperature and quenching the same with an inductor, modified as indicated in Fig. 2. Such an inductor is drilled as at 30 to permit the discharge of quench from each ring on to the heated sleeve during the quenching interval. Thus, after the proper temperature has been attained and the bond is completed the outer surface of the sleeve is flooded with coolant to rapidly drop the temperature of the same below the critical point and retain a hardened structure.

Under some conditions it is desirable to effect the heating in two periods to produce the required end result. In such a case the inductors first heat the bonding region at a rate slow enough and with a proper frequency to permit fairly deep heating and also to permit drift heat to raise the adjacent sleeve and cylinder surfaces to bonding temperature. The bond is then allowed to cool. Thereafter a higher frequency current, to more closely provide a skin effect, is passed through the inductor and the outer wear-receiving portion of the sleeve heated to a hardening temperature fast enough to prevent drift heat to spoil the bond. Thereafter the surface is flooded with quench as above described to rapidly cool the same and produce the desired product.

To insure that the sleeve be fully bonded to the shaft, the sleeve is split or made in sections which thus make it radially moveable relative to the shaft. To insure an intimate bond resiliently operated plungers 35 are carried by one or more of the inductor elements, the end of the plunger bearing against the sleeve and spring or other resilient elements 36 press the sleeve elements toward the shaft when the contacting surfaces reach fusing temperature and the sleeve elements reach hardening temperature.

To avoid a weak section in the shaft a filleted region is provided as at 38 and the end of the sleeve is chamfered or otherwise formed to clear the surface of this fillet to permit the sleeve to form a continuous wear resisting surface without any sudden interruption in form of the shaft. Sharp corners which would otherwise result would endanger breakage due to such corners forming regions from which fatigue cracks start.

The bond material may be of such nature that its fusing temperature is as much higher than the quenching temperature of the applied sleeve as is desired. This permits better control of the quenching, including quenching through a wide range of relative temperatures. It aids in permitting quenching so as to leave some heat within the piece, which residual heat serves to soften or temper the hardened layer, thereby relieving it from internal strains which might cause checking or cracking. The use of such a bonding material will also permit heating the applied sleeve to quenching temperature subsequent to the bonding operation without serious injury to the bonded area.

By selecting a sleeve of proper thickness, by applying power at the proper rate and at the right frequency, and by correctly timing the interruption of heating and the application of quench, the outer surface zone of the sleeve is hardened to the correct degree while the bonding zone is heated to a temperature either much higher or much lower than the hardening temperature of the sleeve whichever is desired. This enables the use of relatively low temperature melting material for the bonding metal and avoids introducing more than a small amount of heat into the shaft or article to which the sleeve or shell is being bonded, and at the same time permits the hardening at a considerably high temperature of a surface zone of the sleeve.

The quenching is accomplished by some fluid, either gas or liquid, directed against the article; or may be accomplished by rapid cooling action due to the conduction of heat from the heated surface to adjacent parts of the article itself; or by direct loss of heat from the heated surface to the free air surrounding the article.

While in general the foregoing description is directed to the attachment and hardening of sleeve members, our invention applies as well to the attachment and hardening of plates, strips, rings, and pieces of various forms and material.

In some cases the bonding temperature is higher than the quenching temperature while in others it is lower. When the bonding temperature is higher than the quenching temperature, the shell is heated sufficiently to effect bonding. The heating is then interrupted and the shell is permitted to cool substantially to the quenching temperature and is then quenched while its temperature is falling. When the bonding temperature is lower than the quenching temperature of the shell, the shell is heated at such frequency and at such rate of power input as to heat its outer or wear resisting part to quenching temperature while its inner or contacting area is heated to bonding temperature. By carefully selecting the frequency and power rate the two temperatures are reached substantially simultaneously.

From the foregoing description it will be seen that we have provided a novel method for manufacturing composite hardened articles of various types and for various uses.

Other modes of applying the principle of our invention may be employed instead of the one explained, change being made as regards the mechanism herein disclosed, provided the means stated by the following claim or the equivalent of such stated means be employed.

We therefore particularly point out and distinctly claim as our invention:

The method of manufacturing a composite metallic article with a hardened wear receiving face thereon, comprising the steps of placing in intimate contact two metal elements of said article to be bonded together, inductively heating said elements in the region of said bond at a rate and with a frequency to permit fairly deep heating to bonding temperature by a magnetic flux field, thereafter inductively heating said wear receiving face to hardening temperature with a current of higher frequency and finally quenching said face by impinging liquid thereon to harden the same without quenching said bonded region.

FRANCIS S. DENNEEN.
WILLIAM C. DUNN.